(12) United States Patent
Chiou

(10) Patent No.: US 9,012,339 B2
(45) Date of Patent: *Apr. 21, 2015

(54) MULTIAXIAL FABRIC FOR BALLISTIC APPLICATIONS

(75) Inventor: Minshon J. Chiou, Clearfield, VA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 971 days.

This patent is subject to a terminal disclaimer.

(21) Appl. No.: 12/086,262

(22) PCT Filed: Dec. 7, 2006

(86) PCT No.: PCT/US2006/061740
§ 371 (c)(1),
(2), (4) Date: Jun. 5, 2008

(87) PCT Pub. No.: WO2007/067951
PCT Pub. Date: Jun. 14, 2007

(65) Prior Publication Data
US 2009/0247031 A1    Oct. 1, 2009

Related U.S. Application Data

(60) Provisional application No. 60/748,758, filed on Dec. 8, 2005.

(51) Int. Cl.
*B32B 7/08* (2006.01)
*F41H 5/04* (2006.01)
(Continued)

(52) U.S. Cl.
CPC .......... *F41H 5/0485* (2013.01); *A41D 31/0061* (2013.01); *B32B 5/26* (2013.01);
(Continued)

(58) Field of Classification Search
CPC ............... Y10T 428/24058; Y10T 428/24017;
A41D 31/0061; A41D 13/00; A41D 13/0002;
A41D 27/12; A41D 2500/00; A41D 2500/10;
A41D 2500/20; A41D 2500/30; A41D
2500/54; B32B 2250/04; B32B 2250/20;
B32B 2255/02; B32B 2255/26; B32B
2262/02; B32B 2262/0269; B32B 2307/558;
B32B 2571/02; B32B 5/06; B32B 5/12;
B32B 5/26; B32B 2260/00; B32B 2262/0261;
B32B 2305/188; B32B 2305/186; B32B
2305/18; B32B 2305/07; B32B 2437/04;
B32B 2437/02; B32B 2437/00; B32B 7/08;
F41H 5/0485; F41H 5/0478; F41H 1/00;
F41H 1/02; F41H 1/04; F41H 5/00; F41H
5/004; F41H 5/0471
USPC ........... 428/911, 98, 102, 105, 107, 108, 109,
428/111, 112, 113, 114, 119, 920; 2/2.5;
89/36.01, 36.02; 442/134, 135, 185,
442/186, 218, 220, 226, 234, 235, 236, 238,
442/239, 246, 247, 248, 249, 250, 251, 254,
442/255, 260, 263, 268, 275, 278, 281, 283,
442/286, 301, 304, 305, 320, 323, 326, 334,
442/366, 381, 394
See application file for complete search history.

(56) References Cited

U.S. PATENT DOCUMENTS 3,094,511 A    6/1963   Hill, Jr. et al.
3,354,127 A    11/1967  Hill, Jr. et al.
(Continued)

FOREIGN PATENT DOCUMENTS

EP    0620410    * 7/1999    ............... F41H 5/04
WO    WO 93/20400    10/1993
WO    WO 00/77283    12/2000

OTHER PUBLICATIONS

Hageman, et al.—An ab initio study of the structual and physical properties of a novel rigid-rod polymer:PIPD—Polymer, 1999, 40, 1313, Elsevier Science Ltd.
(Continued)

*Primary Examiner* — Arti Singh-Pandey
(74) *Attorney, Agent, or Firm* — Andrew G. Golian

(57) ABSTRACT

The invention concerns multiaxial fabrics comprising a first layer comprising a plurality of first yarns being substantially parallel in a first direction; a second layer comprising a plurality of second yarns being substantially parallel in a second direction and skew of off-set with respect to the first yarns; a third yarn layer comprising a plurality of third yarns being substantially parallel in a third direction and skew of off-set with respect to the first yarns and second yarns; a fourth yarn layer comprising a plurality of fourth yarns being substantially parallel in a fourth direction and skew of off-set with respect to the first, second and third yarns; at least one fiber network layer; and a transverse yarn interlaced transversely within the multiaxial fabric where each layer may be arranged in any sequential order and optionally coated with a high viscosity polymer that has a glass transition temperature Tg in the range of about −40 to about 0° C., and a zero shear melt viscosity of about $2 \times 10^6$ to about $10^{13}$ poise at 20° C.

17 Claims, 1 Drawing Sheet

(51) Int. Cl.
  *A41D 31/00* (2006.01)
  *B32B 5/26* (2006.01)
  *B32B 5/06* (2006.01)
  *B32B 5/12* (2006.01)

(52) U.S. Cl.
  CPC ............... *F41H 5/0478* (2013.01); *B32B 5/06* (2013.01); *B32B 5/12* (2013.01); *B32B 2250/04* (2013.01); *B32B 2250/20* (2013.01); *B32B 2255/02* (2013.01); *B32B 2255/26* (2013.01); *B32B 2262/02* (2013.01); *B32B 2262/0269* (2013.01); *B32B 2307/558* (2013.01); *B32B 2571/02* (2013.01)

(56) References Cited

U.S. PATENT DOCUMENTS

| | | | |
|---|---|---|---|
| 3,673,143 A | 6/1972 | Bair et al. | |
| 3,819,587 A | 6/1974 | Kwoleck | |
| 3,869,429 A | 3/1975 | Blades | |
| 4,172,938 A | 10/1979 | Mera et al. | |
| 4,183,993 A | 1/1980 | Benstead et al. | |
| 4,457,985 A | 7/1984 | Harpell et al. | |
| 5,160,776 A | 11/1992 | Li et al. | |
| 5,677,029 A | 10/1997 | Prevorsek et al. | |
| 5,935,678 A | 8/1999 | Park | |
| 6,000,055 A * | 12/1999 | Citterio | 2/2.5 |
| 6,238,768 B1 | 5/2001 | Van de Goot | |
| 6,737,368 B2 * | 5/2004 | Chiou | 442/134 |
| 7,900,267 B2 * | 3/2011 | Chiou | 2/2.5 |
| 8,171,569 B2 * | 5/2012 | Chiou | 2/2.5 |
| 8,658,270 B2 * | 2/2014 | Bottger et al. | 428/107 |
| 2002/0164911 A1 | 11/2002 | Cunningham et al. | |
| 2003/0228815 A1 | 12/2003 | Bhatnagar et al. | |
| 2004/0045428 A1 | 3/2004 | Citerrio | |
| 2004/0132368 A1 | 7/2004 | Price et al. | |
| 2005/0081571 A1 | 4/2005 | Bhatnagar et al. | |
| 2009/0136706 A1 * | 5/2009 | Chiou | 428/105 |
| 2009/0271903 A1 * | 11/2009 | Chiou | 2/2.5 |

OTHER PUBLICATIONS

Klop et al.—XRD study of the new rigid-rod polymer fibre PIPD, Polymer 1998, 39, 5987, Elsevier Science Ltd.

Sikkema,—Design, synthesis and properties of a novel rigid rod polymer, PIPD or "M5": high modulus and tenacity fibres with substantial compressive strenth. Polymer. 1998, 39, 5981, Elsevier Science Ltd.

Brew et al.—The properties of PIPD-fibre/epoxy composites. Composites Science and Technology, 1999, 59, 1109, Elsevier Science Ltd.

Van Der Jagt et al., The potential of a new rigid-rod polymer fibre ('5') in advanced composite structures. Polymer 1999, 40, 1035 Elsevier Science Ltd.

Black et al., Man-Made Fibers—Science and Technology, vol. 2, Section titled Fiber0Forming Aromatic Polyamides, p. 297, Interscience Publishers, 1968.

\* cited by examiner

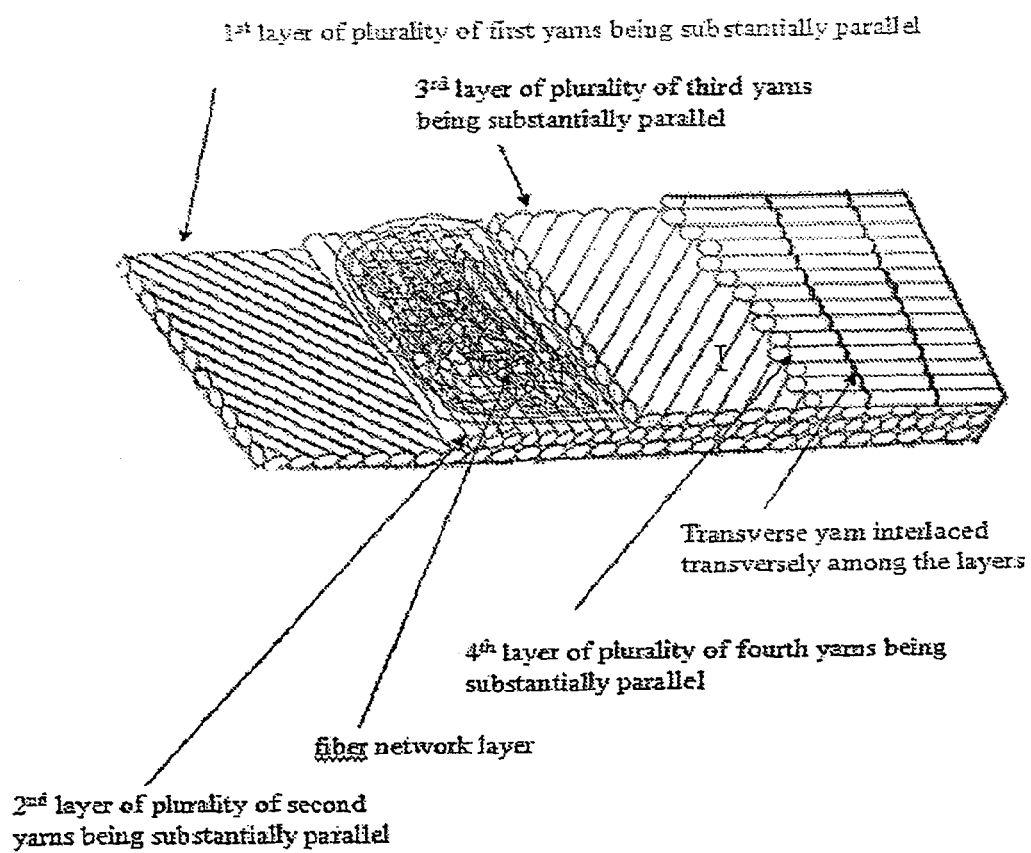

MULTIAXIAL FABRIC FOR BALLISTIC APPLICATIONS

CROSS REFERENCE TO RELATED APPLICATIONS

This application claims benefit of U.S. Application No. 60/748,758 filed Dec. 8, 2005, the disclosure of which is incorporated herein by reference.

FIELD OF THE INVENTION

The present invention is related to a multiaxial fabric useful in ballistic applications.

BACKGROUND OF THE INVENTION

Personal ballistic body armor, particularly vests, helmets, and other articles, are formed generally of materials which serve to prevent penetration of a bullet or other projectile, and any other object that is forcefully applied to the armor, such as a knife. These articles are primarily used for the armed forces, but also have police and civilian applications. There is a growing demand to improve the wearability and the overall effectiveness of armor systems used by soldiers and police offices in combative environments. Overall thickness and weight of armor systems can effect wearability, but reducing these parameters in currently known systems can compromise the armor's effectiveness against penetration.

Fabrics known for ballistic applications include those having at least two layers having unidirectional fibers such that the fibers in the second layer are skew to fibers in the first layer are known. See, for example, U.S. Patent Application Nos. 2002/0164911, 2003/0228815, and 2005/0081571.

Similar constructions have been impregnated with a binding material. See, U.S. Patent Application No. 2004/0045428 and U.S. Pat. No. 6,238,768. U.S. Pat. No. 5,160,776 discloses a composite which has at least one layer that is network of certain high strength filaments in a matrix material. U.S. Pat. No. 4,183,993 discloses the use of laminates in a unidirectional reinforcing fabric that includes a weft knit yarn fabric formed of a multiplicity of weft knit stitches and a multiplicity of parallel longitudinally extending warp inserts held in the weft knit fabric.

U.S. Pat. No. 5,935,678 discloses a ballistic laminate structure in sheet form that includes first and second arrays of unidirectionally-oriented fiber bundles. The second array of fiber bundles is cross-plied at an angle to the first array of fiber bundles. In this construction, a polymeric film resides between the first and second cross-plied arrays of fiber bundles so as to adhere the first and second arrays of fiber bundles together without substantial penetration of the film into the fiber bundles. U.S. Pat. No. 5,677,029 discloses a ballistic article having at least one fibrous layer and at least one polymeric layer that is in contact with and bound to all or portion of the fibrous layer.

Certain fabrics containing both woven and nonwoven layers are also known. See, U.S. Patent Application No. 2004/0132368.

There is a need for ballistic fabrics and articles with improved performance.

SUMMARY OF THE INVENTION

Provided are multiaxial fabrics comprising:

a first layer comprising a plurality of first yarns being substantially parallel in a first direction, a second layer comprising a plurality of second yarns being substantially parallel in a second direction and skew or off-set with respect to the first yarns, at least one fiber network layer, a third yarn layer comprising a plurality of third yarns being substantially parallel in a third direction and skew of off-set with respect to the first yarns and second yarns, a fourth yarn layer comprising a plurality of fourth yarns being substantially parallel in a fourth direction and skew of off-set with respect to the first, second and third yarns, and a transverse yarn interlaced transversely within the multiaxial fabric wherein each layer may be arranged in any sequential order and optionally coated with a high viscosity polymer that has a Tg in the range of about −40 to about 0° C., and a zero shear melt viscosity of about $2 \times 10^6$ to about $10^{13}$ poise at 20° C.

Also provided are garment and article comprising such fabrics and method of making such fabrics.

The foregoing general description and the following detailed description are exemplary and explanatory only and are not restrictive of the invention, as defined in the appended claims.

BRIEF DESCRIPTION OF THE DRAWINGS

Embodiments are illustrated in the accompanying FIGURE to improve understanding of concepts as presented herein.

FIG. 1 includes an illustration of the use of multiple unidirectional layers and transverse fibers in the construction of a multiaxial fabric.

Skilled artisans appreciate that objects in the FIGURE are illustrated for simplicity and clarity and have not necessarily been drawn to scale. For example, the dimensions of some of the objects in the FIGURE may be exaggerated relative to other objects to help to improve understanding of embodiments.

DETAILED DESCRIPTION OF ILLUSTRATIVE EMBODIMENTS

In some embodiments, the invention concerns a multiaxial fabric comprising:

a first layer comprising a plurality of first yarns being substantially parallel in a first direction, a second layer comprising a plurality of second yarns being substantially parallel in a second direction and skew or off-set with respect to the first yarns, at least one fiber network layer, a third yarn layer comprising a plurality of third yarns being substantially parallel in a third direction and skew of off-set with respect to the first yarns and second yarns, a fourth yarn layer comprising a plurality of fourth yarns being substantially parallel in a fourth direction and skew of off-set with respect to the first, second and third yarns, and a transverse yarn interlaced transversely within the multiaxial fabric wherein each layer may be arranged in any sequential order and optionally coated with a high viscosity polymer that has a Tg in the range of about −40 to about 0° C., and a zero shear melt viscosity of about 2×10⁶ to about 10¹³ poise at 20° C.

In certain embodiments, at least one of the first, second, third and fourth yarn layers comprises aramid fiber. One preferred aramid fiber is poly(p-phenylene terephthalamide).

In some embodiments, at least one of the first, second, third and fourth yarn layers comprises polypyridazole fiber. One preferred polypyridazole is a polypyridobisimidazole. One preferred polypyridazole is poly[2,6-d]imidazo[4,5-b:4,5-e]-pyridinylene-1,4-(2,5-dihydroxy)phenylene).

In some embodiments, the at least one fiber network layer is an aramid felt. In some embodiments, the aramid is poly(p-phenylene terephthalamide). In certain embodiments, the aramid felt comprises poly(p-phenylene terephthalamide) staple fiber.

Suitable transverse yarns include those comprising polyester, polyethylene, polyamide, aramid, polyareneazoles, polypyridazoles, or polypyridobisimidazole fiber.

In some embodiments, the at least one fiber network layer is a woven, non-woven, or knit structure.

Also provided are garments and articles comprising a fabric described herein.

In some embodiments, the invention also relates to a method of producing a fabric comprising:
providing a first layer comprising a plurality of first yarns being substantially parallel in a first direction,
providing a second layer comprising a plurality of second yarns being substantially parallel in a second direction and skew or off-set with respect to the first yarns,
providing at least one fiber network layer,
providing a third yarn layer comprising a plurality of third yarns being substantially parallel in a third direction and skew or off-set with respect to the first yarns and second yarns,
providing a fourth yarn layer comprising a plurality of fourth yarns being substantially parallel in a fourth direction and skew or off-set with respect to the first, second and third yarns,
consolidating the layers into a consolidated sheet structure and
bonding multiple consolidated sheet structures together.

The present invention may be understood more readily by reference to the following detailed description of illustrative and preferred embodiments that form a part of this disclosure. It is to be understood that the scope of the claims is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

As used herein, the term "off-set" simply means not directly on top. The term "skew" when referring to two pluralities of yarn means that the pluralities lie at different angles relative to each other. Any angles that provide acceptable performance can be used. One skilled in the art is capable of determining optimum skew for a particular construction. For example, with two layers, the pluralities may be at 0 degrees and 90 degrees. Other examples are 0 degrees/45 degrees/90 degrees and 0 degrees/45 degrees/90 degrees/45 degrees.

Examples of suitable fibers for use in the layers include those made from a polymer such as a polyolefin (for example, polyethylene or polypropylene), polyimide, polyester, poly(vinyl alcohol), polybenzazoles, such as polybenzimidazole (PBI), polyaramid, such as poly(paraphenylene terephthalamide) sold by E. I. du Pont de Nemours and Company (DuPont), Wilmington, Del. under the trade name KEVLAR®, and polypyridazoles, such as the polypyridobisimidazole available from Magellan Systems International, Richmond Va. under the trade name M5®. The tenacity of a fiber should be at least about 900 MPa according to ASTM D-885 in order to provide superior ballistic penetration resistance. Preferably, a fiber also has a modulus of at least about 10 GPa.

When the polymer is polyamide, aramid is preferred. By "aramid" is meant a polyamide wherein at least 85% of the amide (—CO—NH—) linkages are attached directly to two aromatic rings. Suitable aramid fibers are described in *Man-Made Fibers—Science and Technology*, Volume 2, Section titled Fiber-Forming Aromatic Polyamides, page 297, W. Black et al., Interscience Publishers, 1968. Aramid fibers are, also, disclosed in U.S. Pat. Nos. 4,172,938; 3,869,429; 3,819,587; 3,673,143; 3,354,127; and 3,094,511. Additives can be used with the aramid and it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride or the aramid.

The preferred aramid is a para-aramid and poly(p-phenylene terephthalamide)(PPD-T) is the preferred para-aramid. By PPD-T is meant the homopolymer resulting from approximately mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or chloro- or dichloroterephthaloyl chloride or 3,4'-diaminodiphenylether.

When the polymer is polyolefin, polyethylene or polypropylene are preferred. By polyethylene is meant a predominantly linear polyethylene material of preferably more than one million molecular weight that may contain minor amounts of chain branching or comonomers not exceeding 5 modifying units per 100 main chain carbon atoms, and that may also contain admixed therewith not more than about 50 weight percent of one or more polymeric additives such as alkene-1-polymers, in particular low density polyethylene, propylene, and the like, or low molecular weight additives such as anti-oxidants, lubricants, ultra-violet screening agents, colorants and the like which are commonly incorporated. One such polymer is commonly known as extended chain polyethylene (ECPE). Similarly, polypropylene is preferably a predominantly linear polypropylene material of more than one million molecular weight. High molecular weight linear polyolefin fibers are commercially available. Preparation of polyolefin fibers is discussed in U.S. Pat. No. 4,457,985.

Polyareneazole polymers, such as polybenzazoles and polypyridazoles, can be made by reacting a mix of dry ingredients with a polyphosphoric acid (PPA) solution. The dry ingredients may comprise azole-forming monomers and metal powders. Accurately weighed batches of these dry ingredients can be obtained through employment of at least some of the preferred embodiments of the present invention.

Exemplary azole-forming monomers include 2,5-dimercapto-p-phenylene diamine, terephthalic acid, bis-(4-benzoic acid), oxy-bis-(4-benzoic acid), 2,5-dihydroxyterephthalic acid, isophthalic acid, 2,5-pyridodicarboxylic acid, 2,6-naphthalenedicarboxylic acid, 2,6-quinolinedicarboxylic acid, 2,6-bis(4-carboxyphenyl)pyridobisimidazole, 2,3,5,6-tetraaminopyridine, 4,6-diaminoresorcinol, 2,5-diaminohydroquinone, 1,4-diamino-2,5-dithiobenzene, or any combination thereof. Preferably, the azole forming monomers include 2,3,5,6-tetraaminopyridine and 2,5-dihydroxyterephthalic acid. In certain embodiments, it is preferred that that the azole-forming monomers are phosphorylated. Preferably, phosphorylated azole-forming monomers are polymerized in the presence of polyphosphoric acid and a metal catalyst.

Metal powders can be employed to help build the molecular weight of the final polymer. The metal powders typically include iron powder, tin powder, vanadium powder, chromium powder, and any combination thereof.

The azole-forming monomers and metal powders are mixed and then the mixture is reacted with polyphosphoric acid to form a polyareneazole polymer solution. Additional polyphosphoric acid can be added to the polymer solution if desired. The polymer solution is typically extruded or spun through a die or spinneret to prepare or spin the filament.

Polybenzoxazole (PBO) and polybenzothiazole (PBZ) are two suitable polybenzazole polymers. These polymers are described in PCT Application No. WO 93/20400. Polybenzoxazole and polybenzothiazole are preferably made up of repetitive units of the following structures:

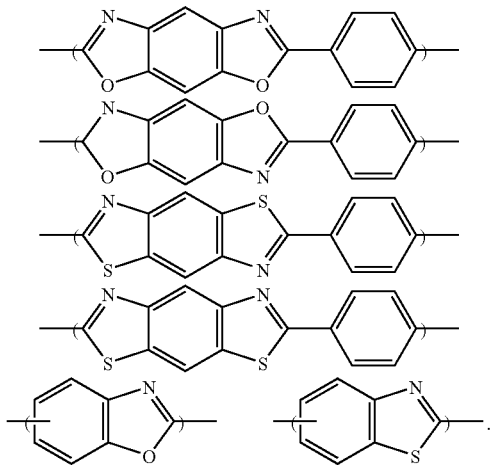

While the aromatic groups shown joined to the nitrogen atoms may be heterocyclic, they are preferably carbocyclic; and while they may be fused or unfused polycyclic systems, they are preferably single six-membered rings. While the group shown in the main chain of the bis-azoles is the preferred para-phenylene group, that group may be replaced by any divalent organic group which doesn't interfere with preparation of the polymer, or no group at all. For example, that group may be aliphatic up to twelve carbon atoms, tolylene, biphenylene, bis-phenylene ether, and the like.

The polybenzoxazole and polybenzothiazole used to make fibers of this invention should have at least 25 and preferably at least 100 repetitive units. Preparation of the polymers and spinning of those polymers is disclosed in the aforementioned PCT Patent Application No. WO 93/20400.

Fibers made from poly(pyridazole) polymers are suitable for use in the present invention. These polymers include poly (pyridimidazle), poly(pyridothiazole), poly(pyridoxazole), poly(pyridobisimidazole), poly(pyridobisthiazole), and poly (pyridobisoxazole).

Poly(pyridobisimidazole) is a rigid rod polymer that is of high strength. The poly(pyridobisimidazole) fiber can have an inherent viscosity of at least 20 dl/g or at least 25 dl/g or at least 28 dl/g. Such fibers include PIPD fiber (also known as M5® fiber and fiber made from poly[2,6-d]imidazo[4,5-b:4,5-e]-pyridinylene-1,4(2,5-dihydroxy)phenylene). PIPD fiber is based on the structure:

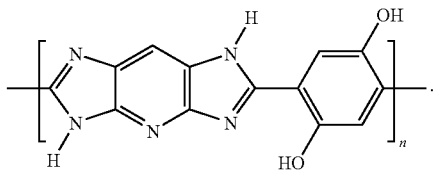

Poly(pyridobisimidazole) fiber can be distinguished from the well known commercially available PBI fiber or poly (benzimidazole) fiber in that that poly(benzimidazole) fiber is a poly(bibenzimidazole). Poly(bibenzimidazole) fiber is not a rigid rod polymer and has low fiber strength and low tensile modulus when compared to poly(pyridobisimidazoles).

PIPD fibers have been reported to have the potential to have an average modulus of about 310 GPa (2100 grams/denier) and an average tenacities of up to about 5.8 GPa (39.6 grams/denier). These fibers have been described by Brew, et al., *Composites Science and Technology* 1999, 59, 1109; Van der Jagt and Beukers, *Polymer* 1999, 40, 1035; Sikkema, *Polymer* 1998, 39, 5981; Klop and Lammers, *Polymer,* 1998, 39, 5987; Hageman, et al., *Polymer* 1999, 40, 1313.

The fabrics, articles, garments, and the like can have additional layers or can have fabrics described herein adjacent other fabrics or sheets. High performance fiber structures can take many forms such as knitted fabric, woven fabric, uni-weave structures, unidirectional sheets, multi-directional sheets (those, for example, having fibers crossing over at an angle between about 20 and 90 degrees), a non-woven layer (for example, felt), or even as single fibers. A fiber structure may take the form of more 10, 20, 40, or 60 layers of individual fiber structures of this invention.

Some layers may be treated With a polymer. Treated layers may be placed at the back, away from the point of impact, or may be placed in the middle, or in any other fashion in order to optimize performance in the body armor. The polymer concentration may be the same for each of the treated layers, or may vary from layer to layer so as to provide a desired variation of stiffness through the pack. Treated layers can be used in a pack consisting of types of fabric structures that may vary from layer to layer.

Protective body armor is one major application for this invention. The high performance fiber structure may be manufactured into body armor by a standard vest-making process such as stitching. Body armor is constructed by manufacturers in order to meet penetration resistance, blunt trauma, and other requirements as established by the National Institute of Justice via NIJ 100-98. According to NIJ 100-98, the manner in which the ballistic panels are assembled into a single unit differs from one manufacturer to another. In some cases, the multiple layers are bias stitched around the entire edge of the panel; in others, the layers are tack stitched together at several locations. Some manufacturers assemble the fabrics with a number of rows of vertical or horizontal stitching; some may even quilt the entire ballistic panel. No evidence exists that stitching impairs the ballistic-resistant properties of a panel. Instead, stitching tends to improve the overall performance, especially in cases of blunt trauma, depending upon the type of fabric used.

In some embodiments of this invention, one or more, high viscosity polymer adhesives with low glass transition temperatures are coated onto or impregnated into a fiber structure. The high viscosity polymer adhesive may be variously referred to as polymer or adhesive. Also, when the term impregnated is used, it should be understood that it is also intended to embrace coating. Excellent ballistic resistance is preserved while blunt trauma resistance is improved. Back face deformation (BFD) is an indicator of blunt trauma, that is, the lower the BFD, the less trauma a person wearing a protective device would sustain. A liquid adhesive impregnated into a fiber structure at low levels is believed to essentially act as a friction enhancer by modifying the sliding friction of the filaments in the weave under ballistic impact conditions. Moreover, such materials provide a reduction in back face deformation, while retaining or slightly improving ballistic resistance to penetration in an article such as body armor. BFD is expressed in millimeters (mm).

In some embodiments, the present invention is also an article comprising one or more layers of a high performance fiber structure impregnated (or coated) with about 1 to 15 percent by weight of a high viscosity adhesive with a $T_g$ between about −40° C. and 0° C. The glass transition temperatures were measured using differential scanning calorimetry (DSC) at 10° C./min heating rates. The center point of the transition was chosen as $T_g$. $T_g$ is expressed in ° C. throughout the specification.

Generally, the liquid adhesives are preferred to solid adhesives. Solid adhesive matrices can result in reduced ballistic penetration resistance, as do other stiffer additives and as well as systems that are too stiff or too high in friction due to the presence of about 15 wt % or more of the adhesive additive. As discussed below, such behavior is expected for very high friction and stiffness in impregnated fabrics as when multiple layers are impacted by high velocity projectiles.

Regarding the response of fabrics with low $T_g$ adhesives during impact, it is important to consider the strain rate dependence of these systems. One way to understand this experimentally is to apply frequency dependent dynamic mechanical methods. For testing, inert glass support fabrics are impregnated with either poly(vinylpropionate) (PVP) or with poly(hexylmethacrylate) (PHM). The PHM is deposited out of solution with toluene and the toluene is removed. These samples are used in frequency dependent dynamic mechanical analysis (DMA). The experiment and equipment are standard and are described in "Use of a Dynamical Mechanical Analyzer to Study Supported Polymers" Starkweather, H. W., Giri, M. R., J. Appl. Polym. Sci. 1982, 27, 1243. The frequency dependent glass transitions are resolved as maxima in the loss signal. Taking the frequency extremes, at 0.1 Hz and 30 Hz the $T_g$ in PHM ranges from −18.5° C. to −2° C., respectively. Over the same frequency range, the $T_g$ for PVP ranges from 3° C. to 12.5° C. These correspond to activation energies of 40 kcal/mol and 65 kcal/mol for PHM and PVP, respectively. The very high strain rates of the ballistic event contribute to a high equivalent frequency of deformation ($>>10^5$ Hz). This elevated strain rate easily converts PVP and PHM from the liquid to the glassy solid phase. For example, at $10^5$ Hz, the $T_g$ based on this activation energy for PHM would be shifted to 25° C. This value shows that even PHM is well into the glassy phase at room temperature under the high strain rates induced by ballistic impact.

The $T_g$ of the high viscosity adhesive used in this invention falls in the range of about −40 to about 0° C. and preferably in the range of about −35 to about −10° C. For these materials, the high strain rates from the ballistic event are enough to shift this frequency dependent $T_g$ above room temperature, converting the viscous adhesives into stiff glassy solids. Because of the low $T_g$ and "fluid" nature, these adhesives provide flexible fabrics for making protective vests that are comfortable under static conditions. If the glass transition is below about −40° C., the strain rates are not high enough to convert the system into a glassy phase.

As noted above, in some preferred embodiments, the adhesives should be high viscosity polymer fluids. They should not be elastic solids, very high molecular weight polymers, semi-crystalline elastic solids, or cross-linked elastic solids. Polymers, such as these, can reduce penetration resistance and will be stiffer, thereby causing a reduction in comfort. Furthermore, the solid adhesives applied at low levels, especially, will not be self-healing and will lose effectiveness once the fabric is deformed substantially.

These high viscosity adhesives impart moderate to relatively high friction. For high viscosity adhesives having a $T_g$ in the range of about −40° C. to about 0° C., elevated friction over a dry fabric control sample correlates well with BFD and contributes to a performance advantage. Viscosity of the impregnated additive also correlates with fabric stiffness.

In addition to $T_g$, the adhesives used in this invention may also be characterized by their molecular weight (Mw) and viscosity. Molecular weights are weight average and typically determined by gel permeation chromatography. The molecular weight of the viscous fluid polymer may, for example, be in the range of about 20,000 to 400,000 g/mol (20,000 to 100,000 in some embodiments). The desired viscosity range for the viscous fluid polymers is about $2 \times 10^6$ to about $10^{13}$ poise. Viscosity is typically measured at room temperature, but generally, the viscosities of the subject adhesives as provided herein are too high at room temperature to be measured by standard techniques. In which case, viscosity is estimated by extrapolating from high temperature melt viscosity, melt flow index characterization or other qualitative rheological characterization. One typical method applied for zero shear viscosity characterization of polymer fluids is cone-and-plate rheometry or capillary viscometry. A low viscosity outside the above range will typically reduce performance, such as in the case of siloxane fluids with low $T_g$, even those with high Mws. These materials reduce friction due to lubrication. This has been correlated with poor ballistic performance as disclosed by Briscoe, B. J., Motamedi, F. "The ballistic impact characteristics of aramid fabrics: the influence of interface friction", *Wear* 1992 158(1-2), 229).

Liquid adhesives with appropriate properties can be formed in many ways including as a suspension, emulsion or melt polymerization and in the form of blend or a copolymer. Examples of polymers useful as high viscosity adhesives herein include poly (vinyl propionate), poly(hexyl methacrylate), poly(isopropyl acrylate), and ethylene/methyl acrylate copolymer (wherein the ethylene content is 38 weight percent and the methyl acrylate content is 62 weight percent).

High viscosity adhesives with flow and modulus properties distinctly different from solid elastomers were impregnated into ballistic fabrics. A desirably high level of both ballistic penetration resistance and back face deformation (a measure of blunt trauma) was found in the range of about 1 to about 15 wt % additive level in polyaramid fabric depending on how many layers were treated. It is believed that this type of system would provide about a 20-30% weight savings compared to the area density needed to provide satisfactory blunt trauma protection in fabric vests currently in use. High viscosity adhesives as used in this invention have a glass transition temperature $T_g$ that enables them to give desirable liquid adhesive performance in this invention, and control back face deformation through viscosity and friction effects in a fiber structure.

For purposes herein, the term "fiber" is defined as a relatively flexible, macroscopically homogeneous body having a high ratio of length to width across its cross-sectional area perpendicular to its length. The fiber cross section can be any shape, but is typically round. Herein, the term "filament" or "continuous filament" is used interchangeably with the term "fiber."

As used herein, the term "staple fibers" refers to fibers that are cut to a desired length or fibers that occur naturally with or naturally have a low ratio of length to width across its cross-sectional area perpendicular to its length when compared with filaments. Length can vary from about 0.1 inch to several feet. In some embodiments, the length is from 0.1 inch to about 8 inches. Man made staple fibers are cut to a length suitable for processing on cotton, woolen, or worsted yarn spinning equipment.

The staple fibers can have (a) substantially uniform length, (b) variable or random length, or (c) subsets of the staple fibers have substantially uniform length and the staple fibers in the other subsets have different lengths, with the staple fibers in the subsets mixed together forming a substantially uniform distribution.

In some embodiments, suitable staple fibers have a length of 1 to 30 centimeters. Staple fibers made by short staple processes result in a fiber length of 1 to 6 centimeters.

The staple fibers can be made by any process. The staple fibers can formed by stretch breaking continuous fibers resulting in staple fibers with deformed sections that act as crimps. The staple fibers can be cut from continuous straight fibers using a rotary cutter or a guillotine cutter resulting in straight (i.e., non crimped) staple fiber, or additionally cut from crimped continuous fibers having a saw tooth shaped crimp along the length of the staple fiber, with a crimp (or repeating bend) frequency of no more than 8 crimps per centimeter.

Stretch broken staple fibers can be made by breaking a tow or a bundle of continuous filaments during a stretch break operation having one or more break zones that are a prescribed distance creating a random variable mass of fibers having an average cut length controlled by break zone adjustment.

Staple fibers of this invention can be converted into yarns using traditional long and short staple ring spinning processes which are well known in the art. For short staple, cotton system spinning fiber lengths from ¾ inch to 2¼ inch (i.e., 1.9 to 5.7 cm.) are typically used. For long staple, worsted or woolen system spinning, fibers up to 6½ inches (i.e., 16.5 cm.) are typically used. However, this is not intended to be limiting to ring spinning because the yarns may also be spun using air jet spinning, open end spinning, and many other types of spinning which converts staple fiber into useable yarns.

The stretch broken staple fibers typically have length of up to 7 inches (i.e., 17.8 cm.) long and can be 15 made using traditional stretch-broken tow to top staple processes. Staple fibers having maximum lengths of up to around 20 inches (i.e., 51 cm) are possible through processes as described for example in PCT Patent Application No. WO 0077283. Yarns are so made by consolidated fibers into spun yarn using filament entanglement with air jets having a tenacity in the range of 3 to 7 grams per decitex. These yarns may have secondary twist, that is, they may be twisted after formation to impart more tenacity to the yarn, in which case the tenacity can be in the 10 to 18 grams per denier (i.e., 9 to 17 grams per dtex) range. Stretch broken staple fibers normally do not require crimp because the process imparts a degree of crimp into the fiber.

The term continuous filament refers to a flexible fiber having relatively small-diameter and whose length is longer than those indicated for staple fibers. Continuous filament fibers can be converted to multifilament yarns by processes well known to those skilled in the art.

Fabrics of this invention can take on numerous configurations, including, but not limited to, knitted or woven fabrics or non-woven structures. Such fabric configurations are well known to those skilled in the art.

By "non-woven" fabric is meant a network of fibers, including unidirectional (if contained within a matrix resin), felt, fiber batts, and the like.

By "woven" fabric is meant a fabric woven using any fabric weave, such as plain weave, crowfoot weave, basket weave, satin weave, twill weave, and the like. Plain and twill weaves are believed to be the most common weaves used in the trade.

The invention is exemplified by the following examples which are not intended to limit the scope of the invention.

EXAMPLES

Comparative Example 1

In the Comparative Example 1, layers of multiaxial fabric are made from high tenacity of 930 dtex poly(p-phenylene terephthalamide) continuous filament yarn with a linear density of 1.66 dtex per filament, available from E. I. DuPont de Nemours and Company under the trademark Kevlar® 129. Each layer of fabric is constructed with four sets of parallel yarns at 7.1 ends per centimeter arranged in different angles and bound together by a set of low denier and low tenacity of loop-forming polyethylene yarn. Areal density of each multiaxial fabric layer is about 0.28 kg/m². The tensile strength of the four sets of yarns used in the multiaxial fabric is 24.3 gram/dtex, and the density of the fiber is 1.44 gram/cm³. The stability of the multiaxial fabric layer is poor. The yarns in the multiaxial fabric layer can be distorted and pushed aside by the penetration of a sharp object. Seventeen layers of the multiaxial fabric of about 15"×15" size are stitched together around the edge and with a cross stitch to form a composite structure with a total areal density of about 4.8 kg/m². The assembly is then tested against 357 mag bullet per NIJ ballistic standard 0101.04 for Level II for both ballistic V50 and backface deformation. The results, especially the backface deformation of the composite structure of the example is expected to be poor due to low structure stability of the fabric layers.

Comparative Example 2

In the Comparative Example 2, layers of woven fabric are made from high tenacity of 930 dtex poly(p-phenylene terephthalamide) continuous filament yarn with a linear density of 1.66 dtex per filament, available from E. I. DuPont de Nemours and Company under the trademark Kevlar® 129. Each layer of fabric is constructed with a plain weave of 7.1 ends per centimeter in both warp and fill directions. Areal density of the woven fabric layer is about 0.132 kg/m². The tensile strength of the yarns used in the woven fabric is 24.3 gram/dtex, and the density of the fiber is 1.44 gram/cm³. The stability of the woven fabric layer is relatively poor. The yarns in woven fabric layer can be distorted and pushed aside by the penetration of a sharp object. Thirty-six layers of the woven fabric of about 15"×15" size are stitched together around the edge and with a cross stitch to form a composite structure with a total areal density of about 4.8 kg/m². The assembly is then tested against 357 mag bullet per NIJ ballistic standard 0101.04 for Level II for both ballistic V50 and backface deformation. The results, especially the backface deformation of the composite structure of the example is expected to be poor due to low structure stability of the fabric layers.

Example 1

In the Example 1, composite layers of this invention are made from high tenacity of 930 dtex poly(p-phenylene terephthalamide) continuous filament yarn with a linear density of 1.66 dtex per filament, available from E. I. DuPont de Nemours and Company under the trademark Kevlar® 129. Each layer of fabric is constructed with a first and second sets of parallel yarns at 7.1 ends per centimeter arranged in different angles, a third set of yarns of a network of fibers of woven fabric of 7.1 ends per centimeter in both warp and fill direction, and a fourth and fifth sets of parallel yarns at 7.1 ends per centimeter arranged in different angles, and then bound together by a set of low denier and low tenacity of loop-forming polyethylene yarn. Areal density of the composite layer of this invention is about 0.412 kg/m². The tensile strength of the four sets of yarns used in the composite layer is 24.3 gram/dtex, and the density of the fiber is 1.44 gram/cm³. The structure stability of the composite fabric layer of this invention is good. Twelve layers of the composite layer of this invention with about 15"×15" size are stitched together around the edge and with a cross stitch to form a composite structure with a total areal density of about 4.9 kg/m². The assembly is then tested against 357 mag bullet per NIJ ballistic standard 0101.04 for Level II for both ballistic V50 and backface deformation. The ballistic V50 is expected to be good, and the backface deformation of the composite structure of the example is expected to be below 44 mm and much better than those disclosed in Comparative Examples 1 & 2.

Example 2

In the Example 2, composite layers of this invention were made from high tenacity of 930 dtex poly(p-phenylene terephthalamide) continuous filament yarn with a linear density of 1.66 dtex per filament, available from E. I. DuPont de Nemours and Company under the trademark Kevlar® 129. Each layer of fabric is constructed with a first and second sets of parallel yarns at 7.1 ends per centimeter arranged in different angles, a third set of yarns of a network of fibers of woven fabric of 7.1 ends per centimeter in both warp and fill direction, and a fourth and fifth sets of parallel yarns at 7.1 ends per centimeter arranged in different angles, and then bound together by a set of low denier and low tenacity of loop-forming polyethylene yarn. Areal density of the composite layer of this invention is about 0.412 kg/m. The tensile strength of the four sets of yarns used in the composite layer is 24.3 gram/dtex, and the density of the fiber is 1.44 gram/cm³. The composite layer is further coated with about 5 wt % of a high viscosity polymer having a Tg in the range of −40° to about 10° C. with a zero share melt viscosity 2×106 to about 1013 poise at 20° C., and a molecular weight of about 20,000 to 100,000. Areal density of each coated composite layer is about 0.432 kg/m². The structure stability of the composite fabric layer of this invention is very good. Eleven layers of the coated composite layer of this invention with about 15"×15" size are stitched together around the edge and with a cross stitch to form a composite structure with a total areal density of about 4.8 kg/m² The assembly is then tested against 357 mag bullet per NIJ ballistic standard 0101.04 for Level II for both ballistic V50 and backface deformation. The results, especially the backface deformation of the composite structure of the example is expected to be very good, well below 44 mm, and much better than those results described in Comparative Examples 1 & 2.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination.

What is claimed:

1. A multiaxial fabric comprising:
    a first layer comprising a plurality of first yarns being substantially parallel in a first direction, a second layer comprising a plurality of second yarns being substantially parallel in a second direction and skew or off-set with respect to the first yarns, at least one fiber network layer, a third yarn layer comprising a plurality of third yarns being substantially parallel in a third direction and skew or off-set with respect to the first yarns and second yarns, a fourth yarn layer comprising a plurality of fourth yarns being substantially parallel in a fourth direction and skew or off-set with respect to the first, second and third yarns, and a transverse yarn interlaced transversely within the multiaxial fabric wherein each layer may be arranged in any sequential order and is coated with a high viscosity liquid polymer that has a Tg in the range of about −40 to about 0° C., and a zero shear melt viscosity of about $2 \times 10^6$ to about $10^{13}$ poise at 20° C. and wherein polymer content is about 1-15 percent by weight.

2. The fabric of claim 1 wherein at least one of the first, second, third and fourth yarn layers comprises aramid fiber.

3. The fabric of claim 2 wherein the aramid fiber is poly(p-phenylene terephthalamide).

4. The fabric of claim 1 wherein at least one of the first, second, third and fourth yarn layers comprises polypyridazole fiber.

5. The fabric of claim 4 wherein the polypyridazole is a polypyridobisimidazole.

6. The fabric of claim 4 wherein the polypyridazole is poly[2,6-diimidazo[4,5-b:4,5-e]-pyridinylene-1,4-(2,5-dihydroxyl)phenylene).

7. The fabric of claim 1 wherein the at least one fiber network layer, comprises an aramid felt.

8. The fabric of claim 7 wherein the aramid is poly(p-phenylene terephthalamide).

9. The fabric of claim 7 wherein the aramid felt comprises poly(p-phenylene terphthalamide) staple fiber.

10. The fabric of claim 1 wherein the transverse yarn comprises fiber of polyester, polyethylene, polyamide, aramid, polyareneazoles, polypyridazoles, or polypyridobisimidazole.

11. The fabric of claim 1 wherein at least one layer is coated with a high viscosity polymer that has a Tg in the range of −40 to about 0° C., and a zero shear melt viscosity of about $2\times10^6$ to about $10^{13}$ poise at 20° C.

12. The fabric of claim 1 wherein the at least one fiber network layer is a woven, non-woven, or knit structure.

13. The fabric of claim 1 wherein the at least one fiber network layer is a woven, structure.

14. The fabric of claim 1 wherein the at least one fiber network layer is a non-woven structure.

15. The fabric of claim 1 wherein the at least one fiber network layer is a knit structure.

16. A garment comprising the fabric of claim 1.

17. An article comprising the fabric of claim 1.

* * * * *